United States Patent
Harel et al.

(10) Patent No.: US 7,145,959 B2
(45) Date of Patent: Dec. 5, 2006

(54) SMART ANTENNA BASED SPECTRUM MULTIPLEXING USING EXISTING PILOT SIGNALS FOR ORTHOGONAL FREQUENCY DIVISION MULTIPLEXING (OFDM) MODULATIONS

(75) Inventors: Haim Harel, New York, NY (US); Alexander Segalovitz, Kefar Sava (IL)

(73) Assignee: Magnolia Broadband Inc., Clinton, NJ (US)

(*) Notice: Subject to any disclaimer, the term of this patent is extended or adjusted under 35 U.S.C. 154(b) by 973 days.

(21) Appl. No.: 10/131,612

(22) Filed: Apr. 25, 2002

(65) Prior Publication Data
US 2002/0172308 A1 Nov. 21, 2002

Related U.S. Application Data

(60) Provisional application No. 60/286,047, filed on Apr. 25, 2001.

(51) Int. Cl.
*H04B 7/02* (2006.01)
(52) U.S. Cl. .................. 375/267; 375/299; 375/347
(58) Field of Classification Search ............. 375/267, 375/299, 347
See application file for complete search history.

(56) References Cited

U.S. PATENT DOCUMENTS

| | | | |
|---|---|---|---|
| 5,781,845 A | 7/1998 | Dybdal et al. ............ | 455/65 |
| 5,832,387 A | 11/1998 | Bae et al. ............. | 455/522 |
| 5,867,478 A | 2/1999 | Baum et al. | |
| 5,960,039 A | 9/1999 | Martin et al. ............ | 375/267 |
| 5,982,327 A | 11/1999 | Vook et al. | |
| 6,351,499 B1 | 2/2002 | Paulraj et al. ........... | 375/267 |
| 6,362,781 B1 | 3/2002 | Thomas et al. | |
| 6,369,758 B1 | 4/2002 | Zhang | |
| 6,901,122 B1* | 5/2005 | Nadgauda et al. ........ | 375/347 |
| 2002/0145968 A1 | 10/2002 | Zhang et al. ............ | 370/206 |

FOREIGN PATENT DOCUMENTS

| | | |
|---|---|---|
| EP | 0 999 658 A2 | 5/2000 |
| EP | 1 204 217 A1 | 5/2002 |
| EP | 1 255 369 A1 | 11/2002 |

(Continued)

*Primary Examiner*—Kevin Kim
(74) *Attorney, Agent, or Firm*—Pearl Cohen Zedek Latzer LLP

(57) ABSTRACT

A system and method for using a group of pilot signals to enhance a data signal within an orthogonal frequency division multiplexing (OFDM) multiple-access scheme is described. The OFDM multiple-access scheme has multiple OFDM transmitters using at least overlapping frequency spectrums, during at least overlapping time period, in at least overlapping geographic areas. A set of data signals and a set of pilot signals are received on antenna elements. Each group of data signals from the set of data signals is uniquely associated with a group of pilot signals from the set of pilot signals. Each pilot signal from the set of pilot signals is uniquely associated with its own code from a set of codes. Each code from the set of codes is uniquely associated with an OFDM transmitter from the multiple OFDM transmitters. A group of pilot signals from the set of pilot signals is identified based on its uniquely associated code. A weight value associated with each antenna element from a set of antenna elements is adjusted so that a level of correlation between the group of pilot signals and the code uniquely associated with the group of pilot signals is enhanced while a level of correlation between the remaining groups of pilot signals from the set of pilot signals and the codes uniquely associated with those remaining group of pilot signals are suppressed.

20 Claims, 7 Drawing Sheets

FOREIGN PATENT DOCUMENTS

| | | |
|---|---|---|
| GB | 2 353 437 A | 2/2001 |
| WO | WO 00/36764 | 6/2000 |
| WO | WO 03/005606 A1 | 1/2003 |
| WO | WO 03/073648 A1 | 9/2003 |

* cited by examiner

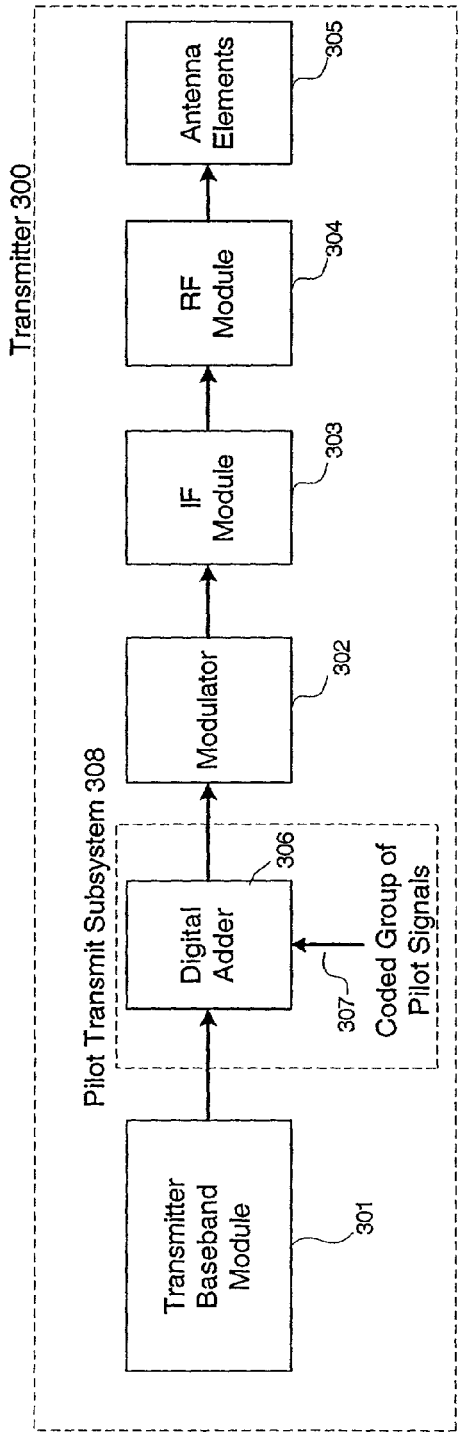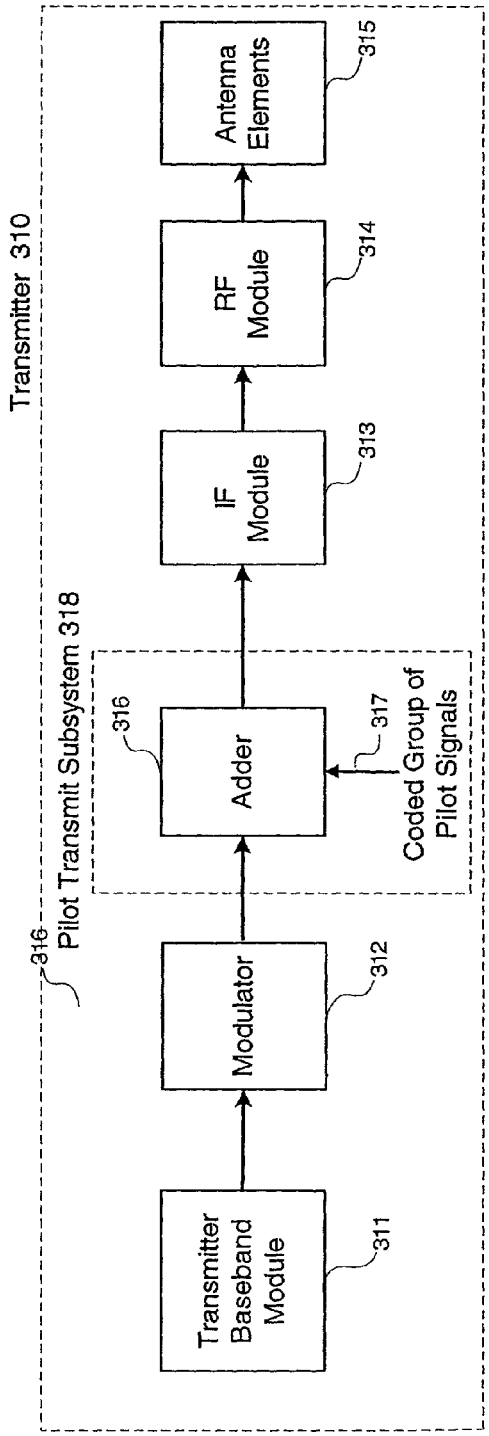
FIG. 4A
FIG. 4B

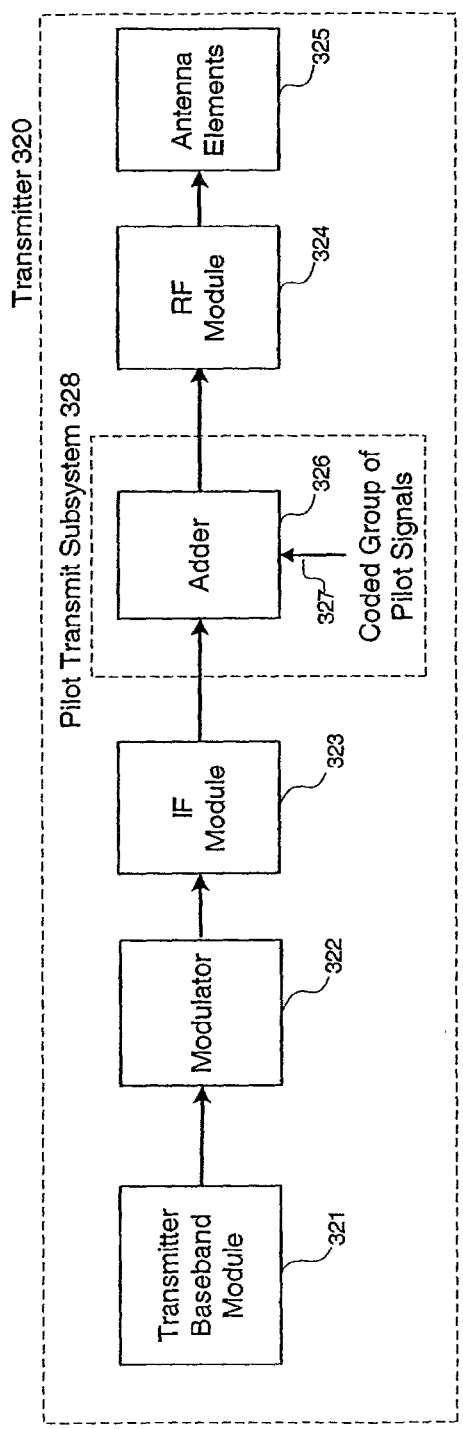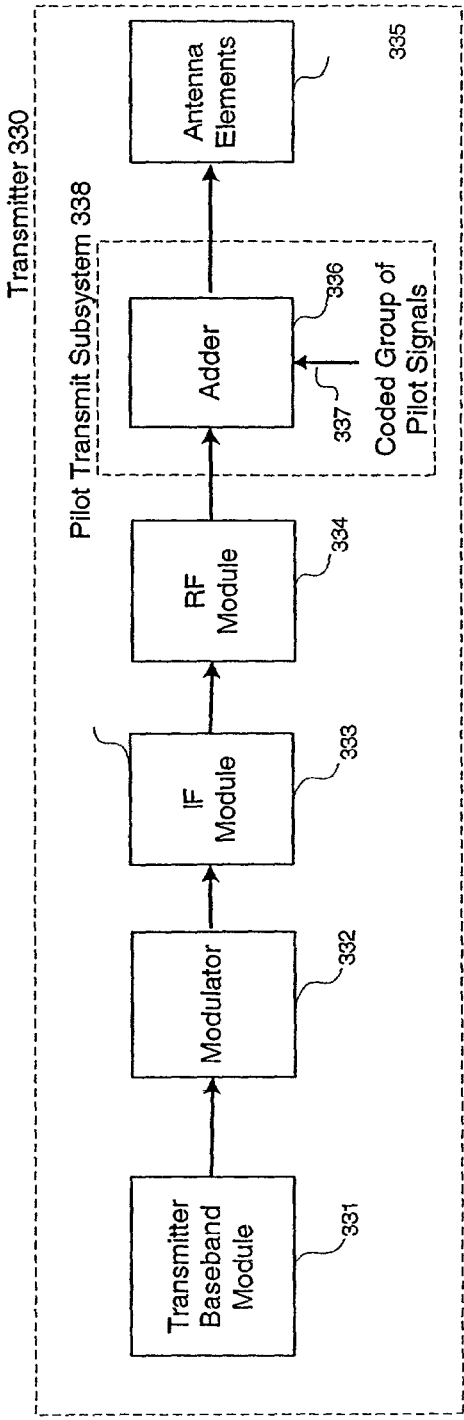
FIG. 4C
FIG. 4D

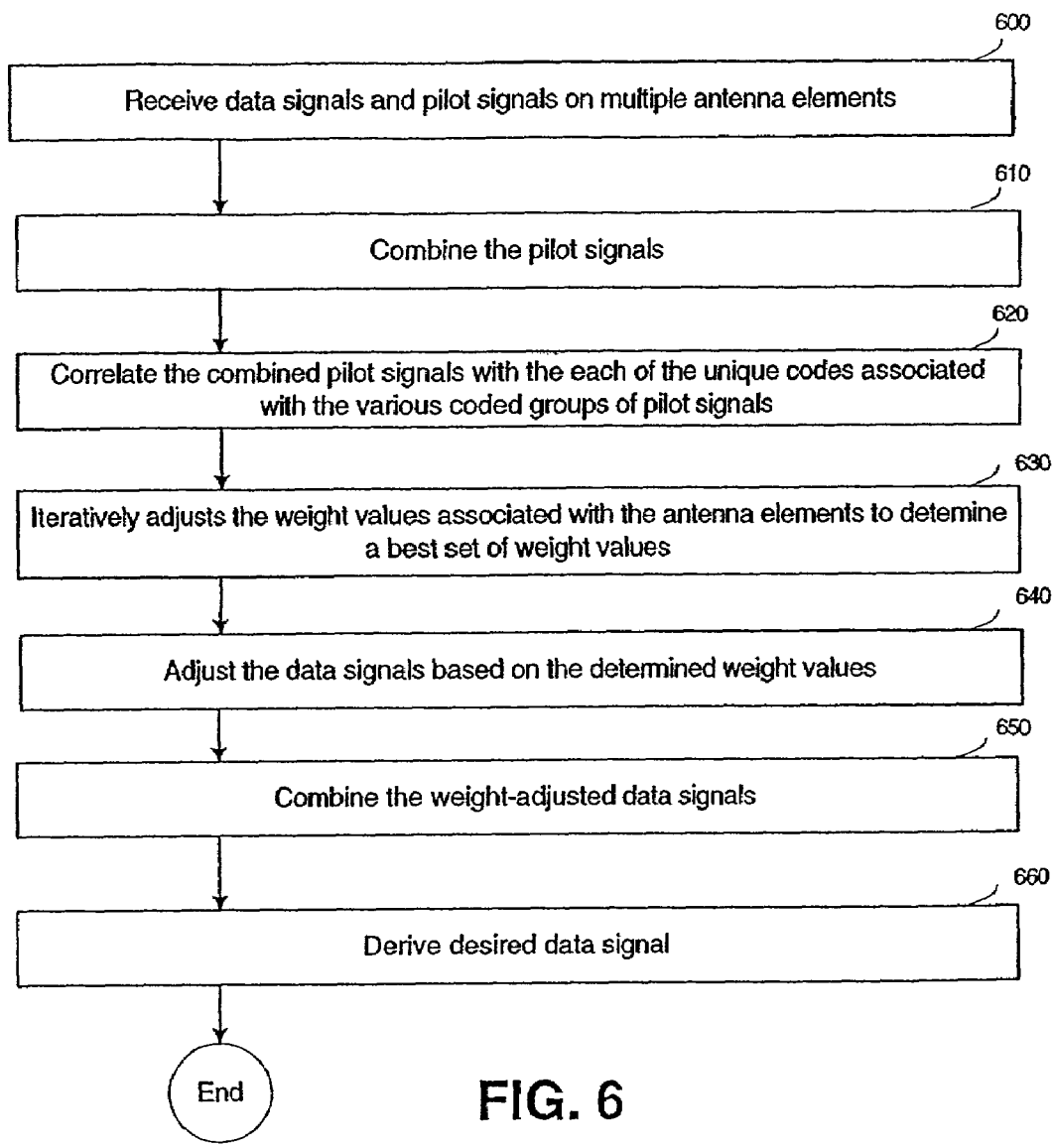

SMART ANTENNA BASED SPECTRUM MULTIPLEXING USING EXISTING PILOT SIGNALS FOR ORTHOGONAL FREQUENCY DIVISION MULTIPLEXING (OFDM) MODULATIONS

CROSS-REFERENCE TO RELATED APPLICATIONS

This application claims priority to co-pending U.S. Provisional Patent Application No. 60/286,047, entitled "Smart Antennae: Using OFDM Pilots for Identification and Quality Measurement," filed on Apr. 25, 2001; and co-pending U.S. patent application Ser. No. 10/082,351, entitled "Smart Antenna Based Spectrum Multiplexing Using a Pilot Signal," filed on Feb. 26, 2002. The entirety of both applications is incorporated herein by reference.

BACKGROUND

The present invention relates generally to communications and more particularly to a system and method for using an existing pilot signal in an OFDM modulated transmitted signal in a communication system, and used by the receiving end, in conjunction with multiple antenna elements. The receiver can implement a separation process known as spatial filtering, or also referred to herein as smart antenna.

Wireless networks and in particular wireless broadband networks having multiple information channels are subject to certain types of typical problems such as inter-channel interference and a limited bandwidth per information channel. For example, broadband wireless networks can use cellular and frequency-reuse schemes to enable the number of simultaneous users to be increased for a given service area within a given allocated spectrum. In such a broadband wireless network, inter-cell interference constrains the aggregated bandwidth of the network.

In sum, a need exists for an improved system and method that can significantly reduce the amount of spectrum allocated to communicate a given amount of data or that can significantly increase the amount of data for a given amount of allocated spectrum.

Orthogonal frequency divisional multiplexing (OFDM) multiple access is one type of modulation scheme used in broadband networks. OFDM modulation is based on multiple carrier frequencies within a given allocated spectrum. Although most of the carrier frequencies carry information, some of the carrier frequencies are "overhead" that are used for management, estimation and calibration of the OFDM channel (i.e., the allocated spectrum used for the OFDM modulation). These "overhead" carrier frequencies are referred to herein as pilots that can carry pilot signals. Typically, these pilot signals are used to improve the frequency offset, phase noise, amplitude normalization, accurate symbol timing, and/or group delay at the receiver. These pilot signals serve as a channel estimator and are typically modulated by a single known code that is used by the entire network.

OFDM modulation can be implemented in various ways including the various standards based on such protocols as 802.11a, DVB-T, BWIF, IEEE 802.16 and others. For example, the IEEE 802.11a standard (also referred to as the WiFi standard) specifies the use of 52 carriers, four of which are designated as pilots and are spread across the allocated spectrum.

As described below, these existing OFDM pilots can be used to reduce the amount allocated spectrum to communicate a given amount of data or to increase the amount of data for a given amount of allocated spectrum.

SUMMARY OF THE INVENTION

A system and method for using a group of pilot signals to enhance a data signal within an orthogonal frequency division multiplexing (OFDM) multiple-access scheme is described. The OFDM multiple-access scheme has multiple OFDM transmitters using at least overlapping frequency spectra, during at least overlapping time periods, in at least overlapping geographic areas. A set of data signals and a set of pilot signals are received on antenna elements. Each group of data signals from the set of data signals is uniquely associated with a group of pilot signals from the set of pilot signals. Each pilot signal from the set of pilot signals is uniquely associated with its own code from a set of codes. Each code from the set of codes is uniquely associated with an OFDM transmitter from the multiple OFDM transmitters. A group pilot signal from the set of pilot signals is identified based on its uniquely associated code. A weight value associated with each antenna element from a set of antenna elements is adjusted so that a level of correlation between the group of pilot signals and the code uniquely associated with the group of pilot signals is enhanced while a level of correlation between the remaining group of pilot signals from the set of pilot signals and the codes uniquely associated with those remaining groups of pilot signals are suppressed.

BRIEF DESCRIPTION OF THE DRAWINGS

FIGS. 4A through 4D show a system block diagram of a transmitter having a pilot transmit subsystem, according to an embodiment of the invention.

FIG. 6 shows a flowchart for receiving and enhancing data signals according to an embodiment of the present invention.

DETAILED DESCRIPTION

Figure 1:
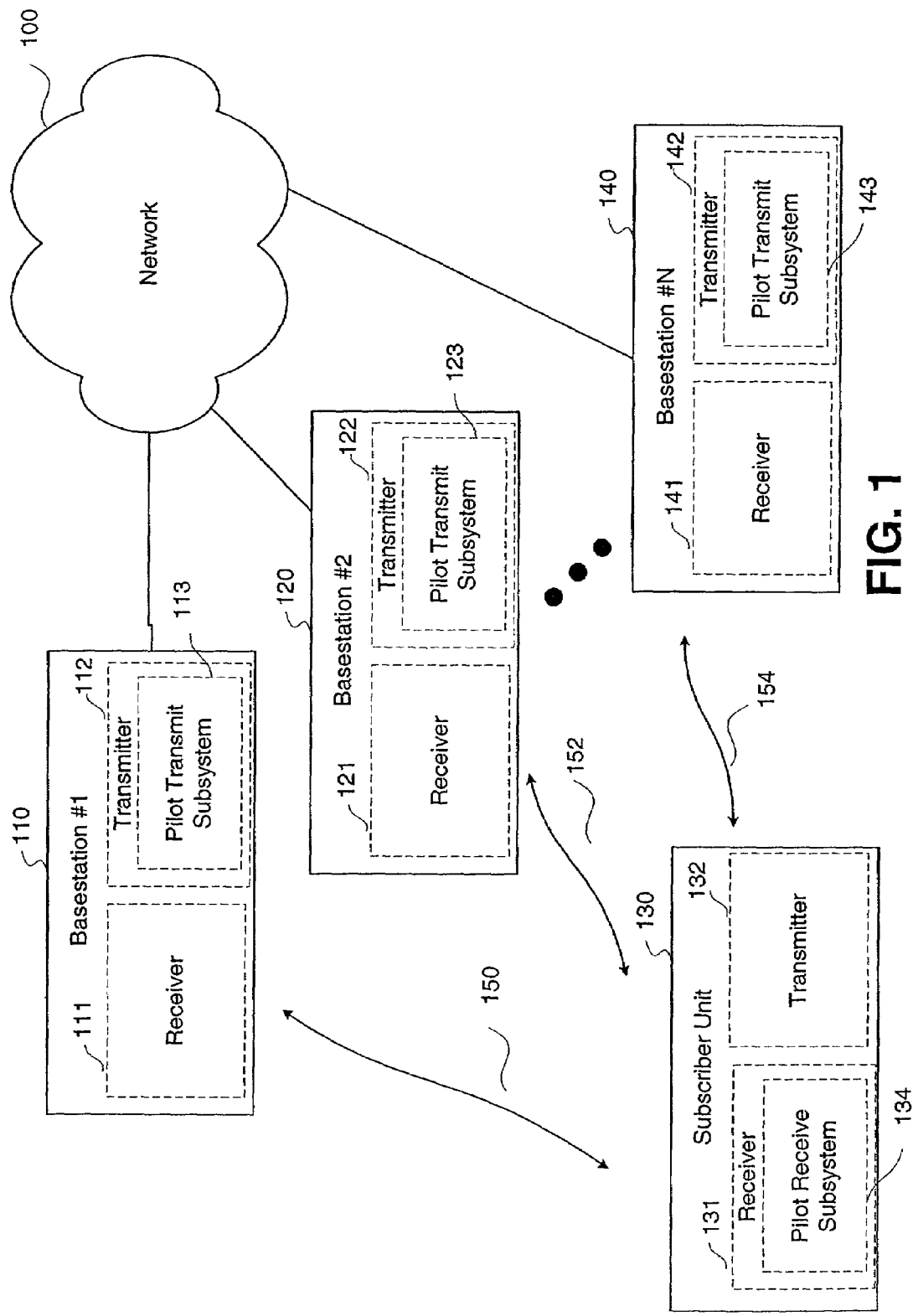
FIG. 1 shows a system block diagram of a communication system using downlink spectrum multiplexing, according to an embodiment of the invention.

The disclosed system and method enable a communication device to transmit in the same frequency channel (i.e., having the substantially same carrier frequency), in the same geographical area, at the same time, by using spatial filtering and associating a unique modulation sequence with each transmitter. In other words, a transmitting communication device can associate a group of pilot signals with a modulation sequence that is unique for each transmitter communication device (also referred to herein as a "coded group of pilot signals"). A corresponding receiving communication device can then use spatial filtering to identify and enhance a desired signal while suppressing the undesired signals based on the received pilot signals.

Note that the use of a coded group of pilot signals associated with a transmitter communication device is a deviation from the common practice in wireless OFDM networks, where the same code is used all over the network. Here, each receiver communication device can be equipped with multiple antennas each of which is associated with its own receiver and demodulator. Each such chain of received data is considered independent from the others because of its use of a different antenna. The output of the above-mentioned demodulators is then divided into two parts—data signals and pilot signals.

The use of a coded group of pilot signals has two aspects. First, channel estimation of the receiver will no longer be done by matching a fixed known code, but rather by searching for, and locking on one of a multiple choice of different known codes (for example 16 different codes for the 4 pilots scheme, 2 to the power of 64 for the 64 pilot scheme etc.). Second, spatial filtering will be done combining the pilot signals input from different antennas, and applying different weights in such a way that discriminates against all groups pilot signals that do not carry a desired code (undesired transmitters), and enhancing the group of pilot signals that carries the desired code (desired transmitter). The actual spatial filtering is done by using the same weights solved for the set of pilot signals, to a weighted combination of the data signals.

Note that a typical subscriber will extract the desired transmitter (e.g., desired basestation) and regard all undesired transmitters as redundant. However, a typical basestation will have several parallel circuits performing spatial filtering: a first circuit will extract first desired signal (first subscriber) and reject the rest, a second circuit will extract the second desired signal (second subscriber) and reject the rest, and so on and so forth. For example, in the 4 pilot-signal system, the maximum number of different transmitters using at least overlapping frequency spectrums, during at least overlapping time period, in at least overlapping geographical areas, is 16. Alternatively, in a 64 pilot-signal system, the maximum number of transmitters is very large, 2 to the power of 64.

The unique modulation sequence associated with a communication link can be, for example, a pre-determined set of codes. Alternatively, the unique modulation sequence associated with each transmitting communication device can be a pseudo random sequence. In these embodiments, the codes for the transmitting communication devices are provided to the receiving communication devices, which use these codes to distinguish between the desired pilot signal and the undesired pilot signals.

For example, under the IEEE 802.11a standard (also the WiFi standard) where four pilot signals are available within the allocated spectrum, Binary Phase Shift Key (BPSK) modulation can be used. In this embodiment, the four pilots signals modulated with BPSK modulation can generate up to 16 unique codes. Thus, up to 16 different transmitting communication devices can use the same frequency channel, at the same time, in the same geographic area.

From the perspective of a communication receiver, the communication receiver receives a group of data signals and a group of pilot signals sent by the desired communication source (e.g., a desired basestation) and at the same time receives a group of data signals and a group of pilot signals sent by each undesired communication source (e.g., undesired basestations). Thus, the communication receiver receives data signals and pilot signals where each group of data signal is uniquely associated with a group of pilot signals that is uniquely associated with its own code. Such a group of pilot signals can include one, some or all of the pilot signals configured for the OFDM multiple-access scheme. The communication receiver then identifies the group of pilot signals from the desired communication source based on the code unique for the transmitter. The communication receiver, having multiple antenna elements, calculates weight values for each antenna element so that a level of correlation between the first group of pilot signals and the code uniquely associated with the first group of pilot signals is enhanced while a level of correlation between the remaining groups of pilot signals and the codes uniquely associated with those remaining groups of pilot signals are suppressed. Accordingly, once the communication receiver has been optimized to receive the desired group of pilot signals, receiving the desired data signal will also be optimized.

The transmission of the coded groups of pilot signals can be performed on the uplink and/or the downlink. For example, in a wireless communication system having multiple basestations and multiple subscriber communication devices, a coded group of pilot signals can be transmitted on the downlink from each basestation. In this configuration, a subscriber communication device receiving signals from multiple basestations over the same frequency spectrum can use the coded group of pilot signals from the desired basestation to extract and enhance the data signal from that desired basestation, while suppressing the data signals from the undesired basestations. In such a configuration, the receiver of each subscriber communication device includes multiple antenna elements.

In an alternative configuration, a coded group of pilot signals can be transmitted on the uplink from each subscriber communication device. In this configuration, a basestation receiving signals from multiple subscriber communication devices over the same frequency spectrum can use the coded group of pilot signals from the desired subscriber communication device, a different coded group of pilot signals for different desired subscriber communication device, and so on to extract and enhance the data signals from those desired subscriber communication devices while suppressing the data signals from the respective undesired subscriber devices. In this configuration, each basestation includes multiple antenna elements.

Note that embodiments of the invention can be used in wireless or wired communications. For example, an embodiment of the invention can be used in multiple-channel wireless communications using, for example, the WiFi (i.e., the IEEE 802.11A) standard. For another example, an embodiment of the invention can be used in a multiple-channel cable system using, for example, OFDM.

FIG. 1 shows a system block diagram of a communication system using downlink spectrum multiplexing, according to an embodiment of the invention. As shown in FIG. 1, network 100 is coupled to basestations 110, 120 and 140, which can in turn be coupled to subscriber unit 130. Note that although FIG. 1 shows three basestations 110, 120 and 140, any number N of basestations can be coupled to network 100. Basestation 110 includes receiver 111 and transmitter 112, which also includes pilot transmit subsystem 113. Basestation 120 includes receiver 121 and transmitter 122, which also includes pilot transmit subsystem 123. Basestation 140 includes receiver 141 and transmitter 142, which also includes pilot transmit subsystem 143. Basestations 110, 120 and 140 can be coupled to subscriber unit 130, for example, by wireless links 150, 152 and 154, respectively. Subscriber unit 130 includes transmitter 132 and receiver 131, which includes pilot receive subsystem 134. In addition, subscriber unit 130 includes a number M of multiple antenna elements that are uncorrelated. In this embodiment, the number N of basestations 110, 120 and 140 can be, for example, greater than the number M of antenna elements at subscriber unit 130.

For the embodiment shown in FIG. 1, downlink spectrum multiplexing is performed by multiple basestations that are transmitting over the same frequency band of allocated spectrum for the OFDM multiple-access scheme. Each basestation 110, 120 and 140 also transmits a coded group of pilot signals with the broadband modulated data signal. The coded group of pilot signals sent by each basestation 110, 120 and 140 is different from the remaining coded groups of pilot signals sent by the remaining basestations 110, 120 and 140. The coded groups of pilot signals are different from each other in the sense that each coded group of pilot signals has an effective cross correlation. Due to this effective cross correlation, the coded group of pilot signals can be distinguished from each other. In addition, each coded group of pilot signals have an effective autocorrelation so that they each can be easily distinguished above the noise.

The subscriber unit 130 uses multiple antenna elements so that the desired broadband signal can be enhanced and the undesired broadband signals can be suppressed. The desired broadband signal originates from the basestation that targets this subscriber unit. The undesired broadband signals originate from the basestations that do not target this subscriber unit although they send data signals within the same channel (the same channel defined, for example, by the same time, the same frequency and the same geographic area). The subscriber unit 130 suppresses undesired broadband data signals and enhances the desired broadband data signal by monitoring the coded groups of pilot signals and manipulating the different antenna elements output so that the desired coded group of pilot signals is enhanced while the undesired coded groups of pilot signals are suppressed.

In sum, an embodiment using downlink spectrum multiplexing allows multiple basestations each to transmit a coded group of pilot signals with its broadband data signal. The broadband data signal sent by these multiple basestations can be within the same frequency band. Meanwhile, the subscriber units each have multiple antenna elements and a pilot receive subsystem that uses the received coded group of pilot signals to enhance the desired data signal.

Figure 2:
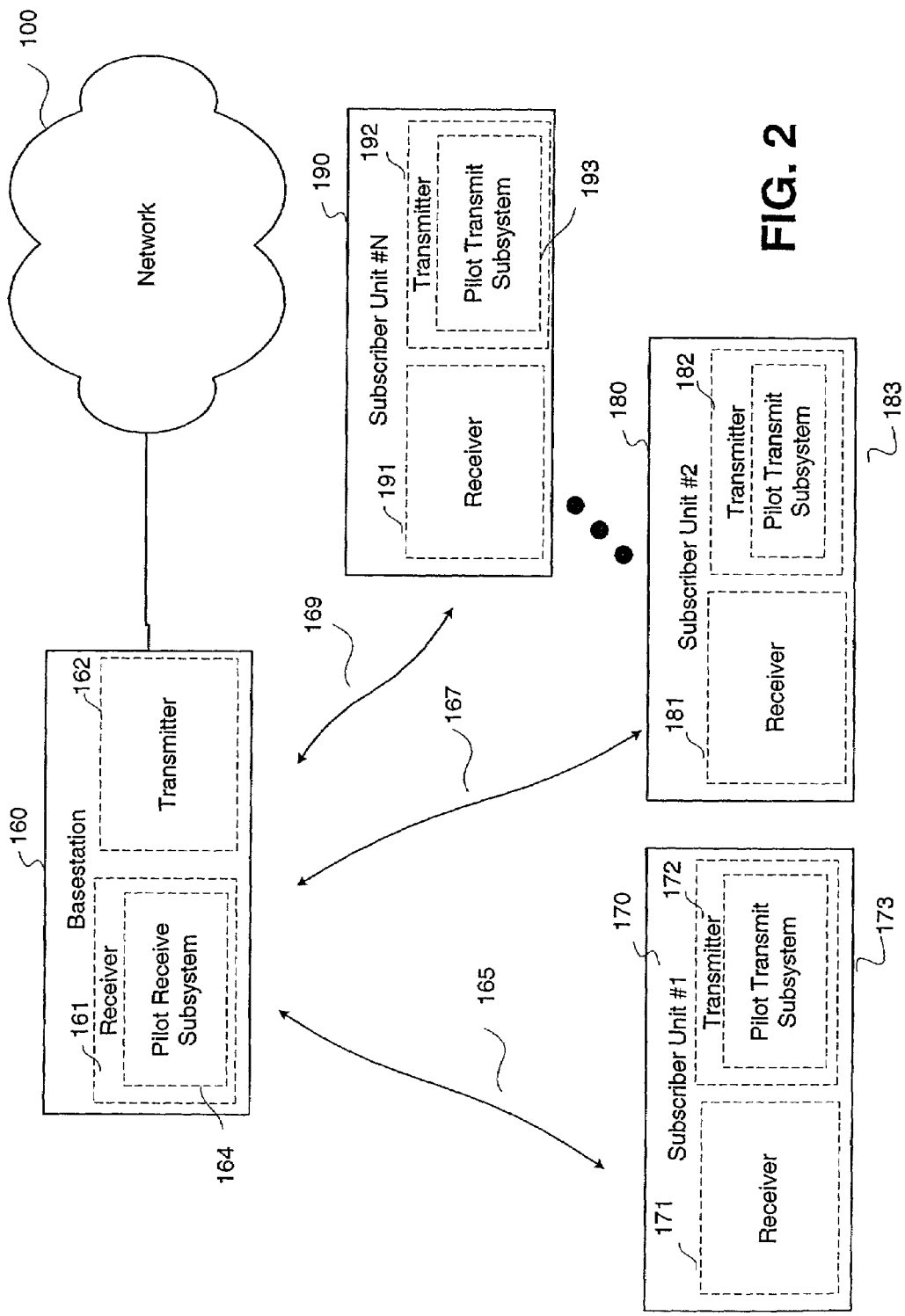
FIG. 2 shows a system block diagram of a communication system using uplink spectrum multiplexing, according to an embodiment of the invention.

FIG. 2 shows a system block diagram of a communication system using uplink spectrum multiplexing, according to an embodiment of the invention. As shown in FIG. 2, network 100 is coupled to basestation 160, which can in turn be coupled to subscriber units 170, 180 and 190. Note that although FIG. 2 shows three subscriber units 170, 180 and 190, any number N of subscriber units can be coupled to basestation 160. Similarly, other basestations (not shown in FIG. 2) can be coupled to network 100: Subscriber unit 170 includes receiver 171 and transmitter 172, which also includes pilot transmit subsystem 173. Subscriber unit 180 includes receiver 181 and transmitter 182, which also includes pilot transmit subsystem 183. Subscriber unit 190 includes receiver 191 and transmitter 192, which also includes pilot transmit subsystem 193. Subscriber units 170, 180 and 190 can be coupled to basestation 160, for example, by wireless links 165, 167 and 169, respectively. Basestation 160 includes transmitter 162 and receiver 161, which includes pilot receive subsystem 164. In addition, basestation 160 includes a number M of multiple antenna elements that are uncorrelated. In this embodiment, the number N of subscriber units 170, 180 and 190 can be, for example, greater than the number M of antenna elements are basestation 160.

For the embodiment shown in FIG. 2, uplink spectrum multiplexing is performed by multiple subscriber units that are transmitting data signals over the same frequency band of allocated spectrum for the OFDM multiple-access scheme. Each subscriber units 170, 180 and 190 also transmits a coded group of pilot signals with the data signal. The coded group of pilot signals sent by each subscriber unit 170, 180 and 190 is different from the remaining coded groups of pilot signals sent by the remaining subscriber units 170, 180 and 190. The coded groups of pilot signals are different from each other in the sense that each coded group of pilot signals has an effective cross correlation. Due to this effective cross correlation, the coded group of pilot signals can be easily distinguished from each other. In addition, each coded group of pilot signals have an effective autocorrelation so that they each can be distinguished above the noise.

The basestation 160 uses multiple antenna elements to separate from each other the different subscriber units that transmit over the same frequency spectrum. Basestation 160 performs this separation by using several circuits (a number of circuits corresponding to the number of simultaneous subscriber units transmitting over the same frequency spectrum). In each of these circuits, one desired subscriber-unit data signal is extracted while the others (undesired data signals) are suppressed. Thus, although FIG. 2 only shows a single pilot-receive subsystem 164 within the basestation 160 for clarity in the figure, basestation 160 can have several such pilot-receive subsystems corresponding to the number of simultaneous subscriber units transmitting over the same frequency spectrum. In other words, the desired group of data signals originate from the subscriber unit that targeted the basestation 160. The undesired groups of data signals originate from the subscriber units that do not target this basestation 160 although they simultaneously send data signals within the same frequency band. The basestation 160 suppresses undesired groups of data signals and enhances the desired group of data signal by monitoring the coded groups of pilot signals and manipulating the different antenna elements output so that the desired coded group of pilot signals is enhanced while the undesired coded groups of pilot signals are suppressed.

In sum, an embodiment using uplink spectrum multiplexing allows multiple subscriber units each to transmit a coded group of pilot signals with its group of data signals. The groups of data signals sent by these multiple subscriber units can be within the same frequency band. Meanwhile, the basestation configured to communicate with one or more of these subscriber units has multiple antenna elements and a pilot receive subsystem that uses the received coded groups of pilot signals to enhance the desired group of data signals.

Figure 3:
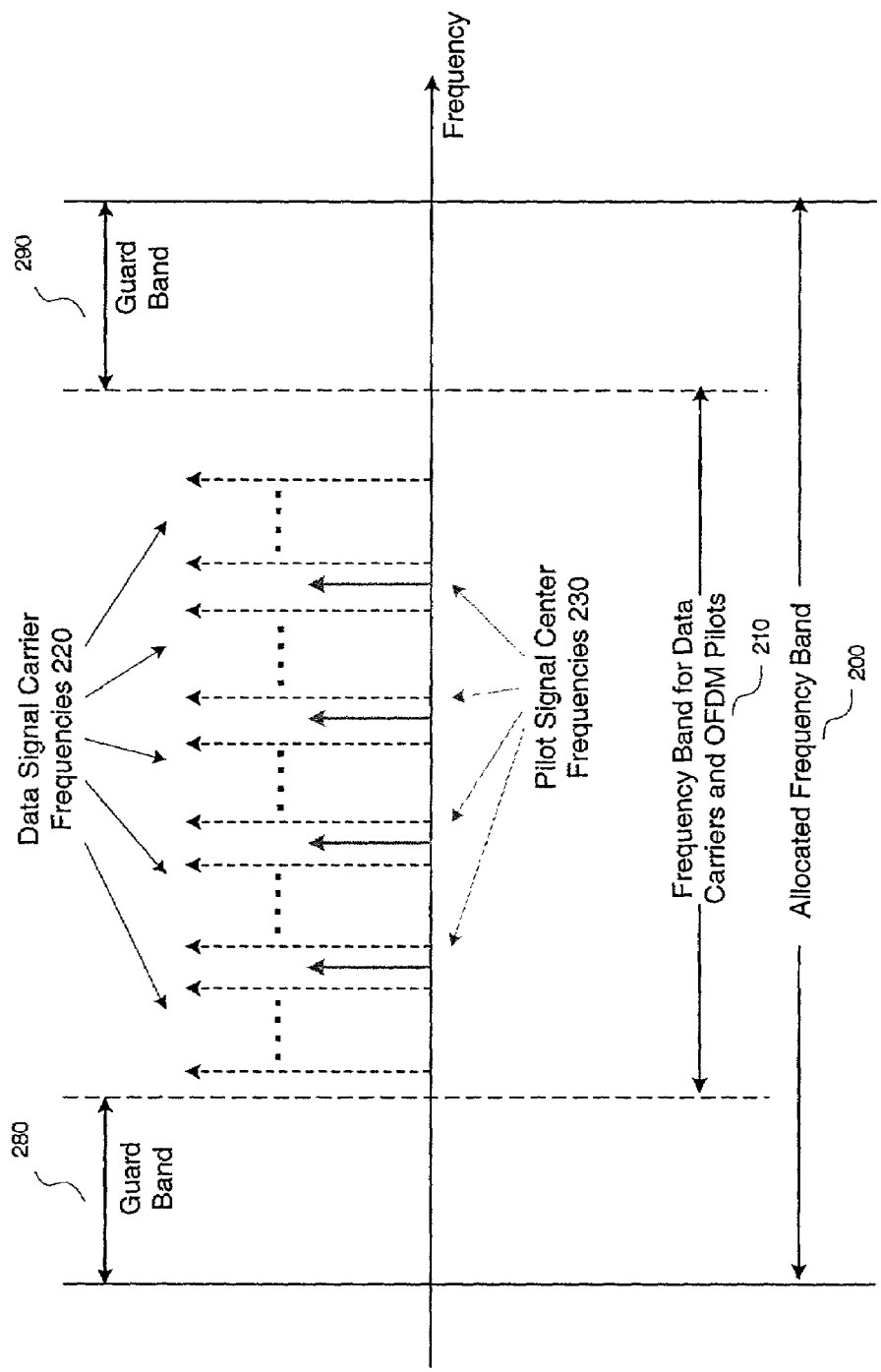
FIG. 3 shows a graph of frequency versus amplitude for data signals and pilot signals within an OFDM multiple-access scheme according to an embodiment of the invention.

FIG. 3 shows a graph of frequency versus amplitude for data signals and pilot signals within an allocated frequency band according to an embodiment of the invention. As shown in FIG. 3, an allocated frequency band 200 includes a frequency band 210 and remaining portions 280 and 290. The frequency band 210 includes a set of data signals 220 and pilot signals 230. The data signals 220 each are uniquely associated with their own carrier frequency. Similarly, the pilot signals 230 each are uniquely associated with their own carrier frequency, which differ from the carrier frequencies of the data signals 220.

The remaining portions 280 and 290 of the allocated frequency band 200 are typically used as guard bands (also referred to as being outside of the power-spectrum mask). These remaining portions 280 and 290 can be, for example a total of 10 percent of the allocation frequency band 200 (i.e., 5 percent on either side of the frequency band 210).

In this configuration, the groups of pilot signals 230 are associated with codes that allow for identification and the enhancement of desired data signals. The codes can be, for example, a pre-determined set of codes or a pseudo random sequence. The codes (or sequences) are selected so that they have effective autocorrelation and cross correlation. This can be accomplished, for example, by selecting the length of each code, $S_L$, to be as long as the shortest message.

Under the 802.11a standard, for example, where four pilot signals are available within the allocated spectrum, Binary Phase Shift Key (BPSK) modulation can be used. In this embodiment, the four pilots signals modulated with BPSK modulation can generate up to 16 unique codes. Thus, up to 16 different transmitting communication devices can be use the same frequency channel, at the same time, in the same geographic area.

FIGS. 4A through 4D shows a system block diagram of a transmitter having a pilot transmit subsystem, according to an embodiment of the invention. By way of illustration, FIGS. 4A through 4D show a system block diagram of transmitters 300, 310, 320 and 330. Any of these transmitters 300, 310, 320 and 330 can correspond to the any of the transmitters 112, 122 and 142 of FIG. 1 and transmitters 172, 182 and 192 of FIG. 2.

As shown in FIG. 4A, transmitter 300 includes transmitter baseband module 301, pilot transmit subsystem 308, modulator 302, intermediate frequency (IF) module 303, radio frequency (RF) module 304 and antenna elements 305. These components are coupled in series. Pilot transmit subsystem 308 includes digital adder 306, which receives a digital coded group of pilot signals 307. The data signal to be transmitted by transmitter 300 is provided from transmitter baseband module 301 to digital adder 306. This data signal is in digital form. The digital adder 306 adds digital coded group of pilot signals 307 to the digital data signal. The digital data signal and digital coded group of pilot signals are converted to analog signals by modulator 302. The frequencies of these analog signals are converted from baseband frequencies to intermediate frequencies by IF module 303. The frequencies of these signals are then converted to radio frequencies by RF module 304. These signals are then transmitted by antenna elements 305.

As shown in FIG. 4B, transmitter 310 includes transmitter baseband module 311, modulator 312, pilot transmit subsystem 318, IF module 313, RF module 314 and antenna elements 315. These components are coupled in series. Pilot transmit subsystem 318 includes adder 316, which receives an analog coded group of pilot signals 317. The data signal to be transmitted by transmitter 310 is provided from transmitter baseband module 311 to modulator 312. The digital data signal is converted to an analog signal by modulator 312. The digital signal is provided to adder 316, which adds the analog coded group of pilot signals 317. The frequencies of these analog signals are converted from baseband frequencies to intermediate frequencies by IF module 313. The frequencies of these signals are then converted to radio frequencies by RF module 314. These signals are then transmitted by antenna elements 315.

As shown in FIG. 4C, transmitter 320 includes transmitter baseband module 321, modulator 322, IF module 323, pilot transmit subsystem 328, RF module 324 and antenna elements 325. These components are coupled in series. Pilot transmit subsystem 328 includes adder 326, which receives an analog coded group of pilot signals 327. The data signal to be transmitted by transmitter 320 is provided from transmitter baseband module 321 to modulator 322. The digital data signal is converted to an analog signal by modulator 322. The frequencies of this analog data signal are converted from baseband frequencies to intermediate frequencies by IF module 323. The analog data signal is provided to adder 326, which adds the analog coded group of pilot signals 327. The frequencies of these signals are then converted to radio frequencies by RF module 324. These signals are then transmitted by antenna elements 325.

As shown in FIG. 4D, transmitter 330 includes transmitter baseband module 331, modulator 332, IF module 333, RF module 334, pilot transmit subsystem 338 and antenna elements 335. These components are coupled in series. Pilot transmit subsystem 338 includes adder 336, which receives an analog coded group of pilot signals 337. The data signal to be transmitted by transmitter 330 is provided from transmitter baseband module 331 to modulator 332. The digital data signal is converted to an analog signal by modulator 332. The frequencies of this analog data signal are converted from baseband frequencies to intermediate frequencies by IF module 333. The frequencies of this analog data signal are then converted to radio frequencies by RF module 334. The analog data signal is provided to adder 336, which adds the analog coded group of pilot signals 337. These signals are then transmitted by antenna elements 335.

Figure 5:
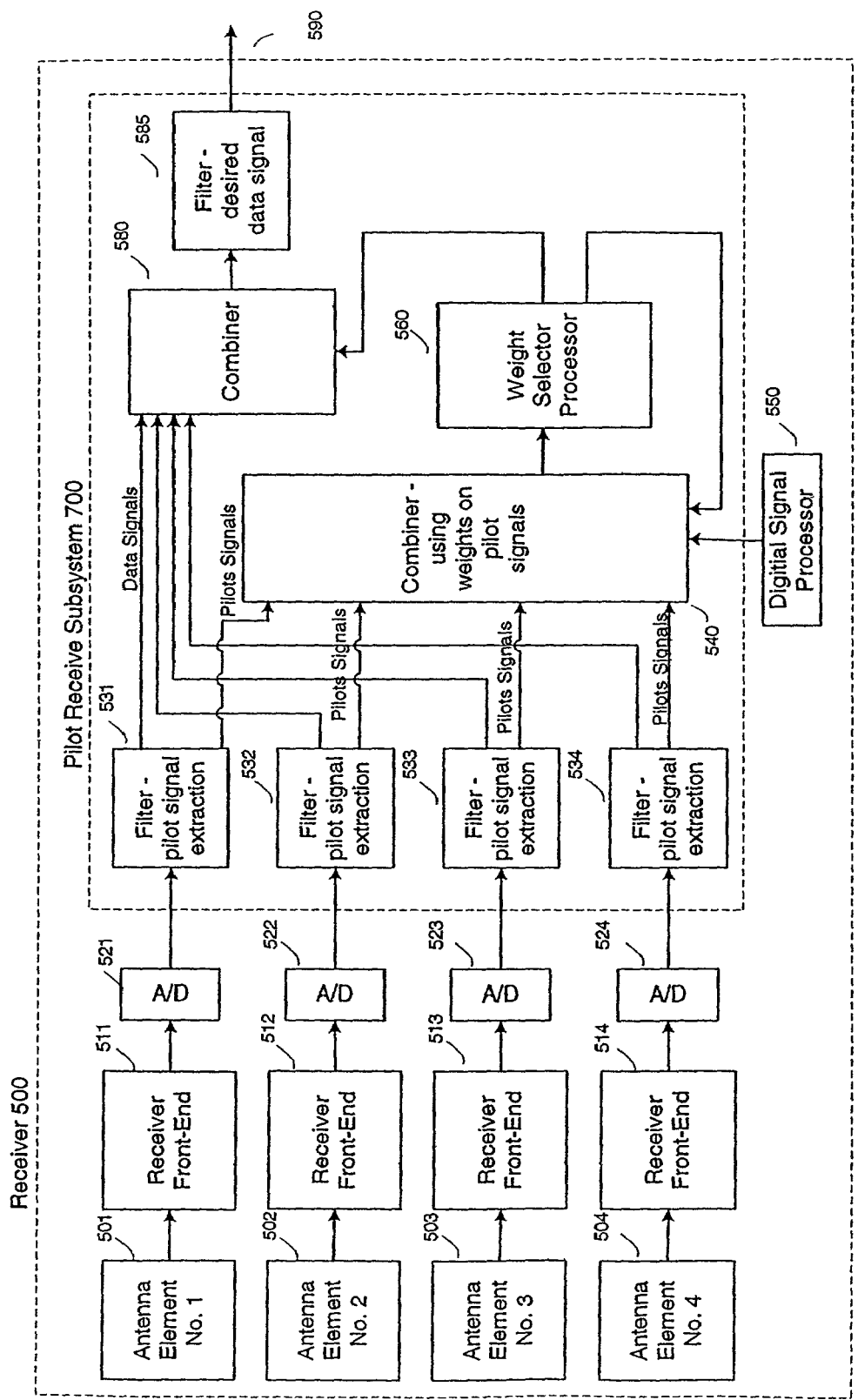
FIG. 5 shows a system block diagram of a receiver having a pilot receive subsystem, according to an embodiment of the invention.

FIG. 5 shows a system block diagram of a receiver having a pilot receive subsystem, according to an embodiment of the invention. The embodiment shown in FIG. 5 can correspond to the receiver 131 of FIG. 1 and receiver 161 of FIG. 2. Note that although FIG. 5 shows a specific embodiment of a receiver having four antenna elements, a receiver can have any number of two or more antenna elements. Such a receiver will have component sets that correspond to the specific number of antenna elements for that receiver embodiment. Note also that the number of antenna elements at the communication receiver is not directly related to the number of pilot signals sent by the OFDM transmitters.

As shown in FIG. 5, receiver 500 includes antenna elements 501, 502, 503 and 504, which are coupled to receiver front ends 511, 512, 513 and 514, respectively. Receiver front-ends 511, 512, 513 and 514 are coupled to A/D converters 521, 522, 523 and 524, respectively, which in turn are coupled to pilot receive subsystem 700. Pilot receive subsystem 700 includes filters 531, 532, 533 and 534, combiners 540 and 580, weight selector processor 560 and filter 585. Combiner 540 of pilot receive subsystem 700 is coupled to digital signal processor 550.

More specifically, A/D converters 521, 522, 523 and 524 are coupled to filters 531, 532, 533 and 534, respectively. Filters 531 through 534 can be, for example, digital signal processors; alternatively these filters can be analog component when the filtering is performed before the A/D converters. Filters 531 through 534 are coupled to combiners 540 and 580. Combiner 540 is coupled to weight selector processor 560, which in turn is coupled to combiner 580. Note that combiner 540 is coupled to weight selector processor 560 in a feedback arrangement, while the weight selector processor 560 is coupled to the combiner 580 without a feedback arrangement. Combiner 580 is coupled to filter 585. For illustrative purposes, the operation of receiver 500 will be explained in reference to the flow chart of FIG. 6.

FIG. 6 shows a flowchart for receiving and enhancing data signals according to an embodiment of the present invention. At step 600, data signals and pilot signals are received on multiple antenna elements. The data signals and pilot signals can be received separately, for example, on antenna elements 501 through 504 as shown in FIG. 5. Thus, each antenna element will generate a composite of the data signals and pilot signals received at its given location.

At step 610, the pilot signals are combined. As shown in FIG. 5, combiner 540 combines the digitized pilot signals received from filters 531 through 534. Combiner 540 provides the combined pilot signals to weight selector 540.

At step 620, weight selector processor 560 correlates the combined pilot signals with the each of the unique codes associated with the various coded groups of pilot signals. For example, where the unique codes are pre-determined codes, weight selector processor 560 can correlate the combined pilot signals with each known unique code. A level of correlation between each unique code and the combined pilot signals is determined. As shown in FIG. 5, digital signal processor 550 can identify the desired group of pilot signals from the remaining groups of pilot signals based on the level of correlation for the known code uniquely associated with the desired group of pilot signals. Note that digital signal processor 550 can also provide the appropriate control/status signals to the remaining components of the pilot-receive subsystem 700 via connections not shown in FIG. 5.

At step 630, weight selector 560 iteratively adjusts a weight value associated with each antenna element 501 through 504 to find a best set of weight values whereby the level of correlation between the desired group of pilot signals and the desired code is enhanced while the level of correlation between the remaining groups of pilot signals and the codes for those remaining groups of pilot signals are suppressed. This iterative process can be performed through the feedback connection between weight selector processor 560 and combiner 540. After a new set of weight values are determined by weight selector processor 560, these weight values can be provided to combiner 540, which applies these new weight values to the pilot signals. This process can proceed until the substantially best set of weight values associated with the antenna elements is determined and those determined weight values are provided to combiner 580.

Note that the process described above in reference to step 630 can be performed in other ways. For example, the process of adjusting the weight value associated with each antenna element need not be iterative. For example, in an alternative embodiment, the process of adjusting the weight value associated with each antenna element can be performed analytically. Such an analytical solution can be based on, for example, resolving a co-variance matrix.

At step 640, the data signals are adjusted based on the determined weight values. As shown in FIG. 5, combiner 580 receives data signals from filters 531 through 534, where each filter 531 through 534 provides the data signals associated with an antenna element 501 through 504, respectively. Combiner 580 adjusts each of these signals from filters 531 through 534 based on the determined weight values from weight selector 560.

Because changes in the desired group of pilot signals correspond to changes in the desired data signal, the desired data signal will also be enhanced in the process of enhancing the level of correlation between the desired group of pilot signals and its unique code. Thus, the determined weight values that enhance the level of correlation between the desired group of pilot signals and its unique code also enhance the desired data signal. Similarly, because the changes in the remaining (undesired) group of pilot signals correspond to changes in the undesired data signals, the undesired data signals will be suppressed in the process of suppressing the undesired groups of pilot signals and their unique codes. Thus, the determined weight values that reduce the level of correlation between the undesired groups of pilot signals and their unique codes also reduce the undesired data signal.

At step 650, the weight-adjusted data signals are combined. More specifically, combiner 560 adds the weight-adjusted data signals to produce a single output having the weight-adjusted data signals corresponding to all of the antenna elements 501 through 504. At step 690, the undesired data signals are filtered out so that only the desired data signal remains. Turning to FIG. 5, the pilot signals can be filtered out by filter 585, which can be for example a band-pass filter. Following the example shown in FIG. 3, the band-pass filter 570 can correspond to the data frequency band having a carrier frequency 220. Correspondingly, the undesired data signals corresponding to other carrier frequencies 220 are removed by filter 585.

Note that the weight selector processor 560 and combiner 560 can be implemented in a number of ways. For example, weight selector processor 560 can split the received pilot signals, each being associated with a specific antenna element 501 through 504, into an in-phase component and a quadrature component. Then, a first weight value associated with the in-phase component and a second weight value associated with the quadrature component for each antenna element can be iteratively determined. In this configuration, the combiner 580 can receive the first and second weight values for each antenna element from weight selector processor 560. Weight selector processor 560 can then split the received data signals, each being associated with a specific antenna element 501 through 504, into an in-phase component and a quadrature component. Weight selector processor 560 can then apply the first weight value associated with the in-phase component and a second weight value associated with the quadrature component for each antenna element to the corresponding components of the data signals.

As described above, the receiving communication device can uses spatial filtering to identify and enhance a desired signal while suppressing the undesired signals based on the received pilot signals. The inventors expect a minimum processing gain of $10*LOG(4*S_L)$, which is also the expected level of interference cancellation. The interference cancellation level is expected to improve with the message length of the pilot signals. The messages of the pilot signals can be delayed by a time period, for example, of twice the length of the shortest message to allow for detection of the beginning of a new message from the desired communication device.

CONCLUSION

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents.

The previous description of the embodiments is provided to enable any person skilled in the art to make or use the invention. While the invention has been particularly shown and described with reference to embodiments thereof, it will be understood by those skilled in the art that various changes in form and details may be made therein without departing from the spirit and scope of the invention.

For example, an embodiment can be configured within a communication system according to the Broadband Wireless Internet Forum (BWIF) standard. Under this standard, consider an example of 128 channels within the data-frequency band. For this example, only 106 channels are used for data signals while the remaining 22 channels are zero-tone channels. Consequently, about 17 percent of the data-frequency band is unused by the data signals and pilot signals can be located on these unused channels.

What is claimed is:

1. A method for using a group of pilot signals to enhance a data signal within an orthogonal frequency division multiplexing (OFDM) multiple-access scheme having a plurality of OFDM transmitters using at least overlapping frequency spectrums, during at least overlapping time periods, in at least overlapping geographic areas, comprising:

receiving a plurality of data signals and a plurality of pilot signals on a plurality of antenna elements, the received plurality of data signals having a plurality of data-signal components each being uniquely associated with an antenna element from the plurality of antenna elements, the received plurality of pilot signals having a plurality of pilot-signal components each being uniquely associated with an antenna element from the plurality of antenna elements, each group of data signals from the plurality of data signals being uniquely associated with a group of pilot signals from the plurality of pilot signals, each group of pilot signals from the plurality of pilot signals being uniquely associated with its own code from a plurality of codes, each code from the plurality of codes being uniquely associated with an OFDM transmitter from the plurality of OFDM transmitters;

performing, in parallel, the following for each group of pilot signals from the plurality of pilot signals:

identifying that group of pilot signals from the plurality of pilot signals based on its uniquely associated code; and adjusting a weight value associated with each antenna element from the plurality of antenna elements so that a level of correlation between that group of pilot signals and the code uniquely associated with that group of pilot signals is enhanced while a level of correlation between the remaining group of pilot signals and the codes uniquely associated with those remaining groups of pilot signals are suppressed, the adjusting step including:

combining the plurality of pilot signals via a network of phase and amplitude manipulations to produce a combination of pilot signals;

correlating the combination of pilot signals with the code associated with the group of pilot signals to produce the weight value associated with each antenna element from the plurality of antenna elements whereby a level of correlation between the group of pilot signals and the code uniquely associated with the group of pilot signals is enhanced while a level of correlation between the remaining group of pilot signals and the codes uniquely associated with those remaining groups of pilot signals are suppressed.

2. The method of claim 1, wherein the correlating is performed iteratively.

3. The method of claim 1, wherein the correlating is performed analytically resolving a co-variance matrix.

4. A method for using a group of pilot signals to enhance a data signal within an orthogonal frequency division multiplexing (OFDM) multiple-access scheme having a plurality of OFDM transmitters using at least overlapping frequency spectrums, during at least overlapping time periods, in at least overlapping geographic areas, comprising:

receiving a plurality of data signals and a plurality of pilot signals on a plurality of antenna elements, each group of data signals from the plurality of data signals being uniquely associated with a group of pilot signals from the plurality of pilot signals, each group of pilot signals from the plurality of pilot signals being uniquely associated with its own code from a plurality of codes, each code from the plurality of codes being uniquely associated with an OFDM transmitter from the plurality of OFDM transmitters;

performing, in parallel, the following for each group of pilot signals from the plurality of pilot signals:

identifying that group of pilot signals from the plurality of pilot signals based on its uniquely associated code: and adjusting a weight value associated with each antenna element from the plurality of antenna elements so that a level of correlation between that group of pilot signals and the code uniquely associated with that group of pilot signals is enhanced while a level of correlation between the remaining group of pilot signals and the codes uniquely associated with those remaining groups of pilot signals are suppressed: and substituting a preexisting OFDM code associated with the plurality of pilot signals with the plurality of codes, each code from the plurality of codes being uniquely associated with:

(1) a group of pilot signals from the plurality of pilot signals, and (2) a OFDM transmitter from the plurality of OFDM transmitters.

5. The method of claim 4, further comprising:

the plurality of pilot signals having been embedded with the plurality of codes before a transmitting step, each code from the plurality of codes having been embedded by a unique one OFDM transmitter from the plurality of OFDM transmitters, the plurality of codes having replaced a preexisting OFDM code previously associated with the plurality of pilot signals, the preexisting OFDM code having been a fixed code associated all pilot signals within a network.

6. The method of claim 4, further comprising:

the plurality of pilot signals having been embedded with the plurality of codes before the receiving step, the plurality of codes having replaced a preexisting OFDM code previously associated with the plurality of pilot signals.

7. A method for using a group of pilot signals to enhance a data signal within an orthogonal frequency division multiplexing (OFDM) multiple access scheme having a plurality of OFDM transmitters using at least overlapping frequency spectrums, at least overlapping time periods, in at least overlapping geographic areas, comprising:

receiving a plurality of data signals and a plurality of pilot signals on a plurality of antenna elements, the received plurality of data signals having a plurality of data-signal components each being uniquely associated with an antenna element from the plurality of antenna elements, the received plurality of pilot signals having a plurality of pilot-signal components each being uniquely associated with an antenna element from the plurality of antenna elements, each group of data signals from the plurality of data signals being uniquely associated with a group of pilot signals from the plurality of pilot signals, each group of pilot signals from the plurality of pilot signals being uniquely associated with its own code from a plurality of codes and being uniquely associated with a OFDM transmitter from the plurality of OFDM transmitters;

identifying a group of pilot signals from the plurality of pilot signals based on its uniquely associated code; and adjusting a weight value associated with each antenna element from the plurality of antenna elements so that a level of correlation between the group of pilot signals and the code uniquely associated with the group of pilot signals is enhanced while a level of correlation between the remaining group of pilot signals and the codes uniquely associated with those remaining groups of pilot signals are suppressed, the adjusting step including:

combining the plurality of pilot signals via a network of phase and amplitude manipulations to produce a combination of pilot signals;

correlating the combination of pilot signals with the code associated with the group of pilot signals to produce the weight value associated with each antenna element from the plurality of antenna elements whereby a level of correlation between the group of pilot signals and the code uniquely associated with the group of pilot signals is enhanced while a level of correlation between the remaining group of pilot signals and the codes uniquely associated with those remaining groups of pilot signals are suppressed.

8. The method of claim 7, further comprising:

applying the weight value associated with each antenna element from the plurality of antenna elements to the plurality of data signals to produce a modified plurality of data signals; and extracting, from the modified plurality of data signals, the group of data signals associated with the first group of pilot signals.

9. The method of claim 7, further comprising:

performing, in parallel, the following for each remaining groups of pilot signals from the plurality of pilot signals:

identifying that group of pilot signals from the plurality of pilot signals based on its uniquely associated code;

adjusting a weight value associated with each antenna element from the plurality of antenna elements so that a level of correlation between that group of pilot signals and the code uniquely associated with that group of pilot signals is enhanced while a level of correlation between the remaining group of pilot signals and the codes uniquely associated with those remaining groups of pilot signals are suppressed;

applying the weight value associated with each antenna element from the plurality of antenna elements to the plurality of data signals to produce a modified plurality of data signals; and extracting, from the modified plurality of data signals, the group of data signals associated with that group of pilot signals.

10. The method of claim 7, wherein the correlating is performed iteratively.

11. The method of claim 7, wherein the correlating is performed analytically resolving a co-variance matrix.

12. A method for using a group of pilot signals to enhance a data signal within an orthogonal frequency division multiplexing (OFDM) multiple access scheme having a plurality of OFDM transmitters using at least overlapping frequency spectrums, at least overlapping time periods, in at least overlapping geographic areas, comprising:

receiving a plurality of data signals and a plurality of pilot signals on a plurality of antenna elements, each group of data signals from the plurality of data signals being uniquely associated with a group of pilot signals from the plurality of pilot signals, each group of pilot signals from the plurality of pilot signals being uniquely associated with its own code from a plurality of codes and being uniquely associated with a OFDM transmitter from the plurality of OFDM transmitters;

identifying a group of pilot signals from the plurality of pilot signals based on its uniquely associated code;

adjusting a weight value associated with each antenna element from the plurality of antenna elements so that a level of correlation between the group of pilot signals and the code uniquely associated with the group of pilot signals is enhanced while a level of correlation between the remaining group of pilot signals and the codes uniquely associated with those remaining groups of pilot signals are suppressed; and substituting a preexisting OFDM code associated with the plurality of pilot signals with the plurality of codes, each code from the plurality of codes being uniquely associated with:

(1) a group of pilot signals from the plurality of pilot signals, and (2) an OFDM transmitter from the plurality of OFDM transmitters.

13. The method of claim 12, further comprising:

the plurality of pilot signals having been embedded with the plurality of codes before a transmitting step, each code from the plurality of codes having been embedded by a unique one OFDM transmitter from the plurality of OFDM transmitters, the plurality of codes having replaced a preexisting OFDM code previously associated with the plurality of pilot signals, the preexisting OFDM code having been a fixed code associated all pilot signals within a network.

14. The method of claim 12, further comprising:

the plurality of pilot signals having been embedded with the plurality of codes before the receiving step, the plurality of codes having replaced a preexisting OFDM code previously associated with the plurality of pilot signals.

15. An apparatus having a plurality of antenna elements configured to receive a plurality of data signals and a plurality of pilot signals according to an orthogonal frequency division multiplexing (OFDM) multiple-access scheme having a plurality of OFDM transmitters using at least overlapping frequency spectrums, at least overlapping time periods, in at least overlapping geographic areas each OFDM transmitter from the plurality of OFDM transmitters being unique associated with its own code from the plurality of codes, comprising:

a first combiner configured to receive a plurality of pilot signals, the received plurality of pilot signals having a plurality of pilot-signal components each being uniquely associated with an antenna element from a plurality of antenna elements, each group of pilot signals from the plurality of pilot signals being uniquely associated with its own code from the plurality of codes;

the second combiner configured to:
  receive the plurality of data signals, the received plurality of data signals having a plurality of data-signal components each being uniquely associated with an antenna element from the plurality of antenna elements, each group of data signals from the plurality of data signals being uniquely associated with a group of pilot signals from the plurality of pilot signals; and
  combine the plurality of pilot signals via a network of phase and amplitude manipulations to produce a combination of pilot signals; and
a weight selector processor coupled to the first combiner and the second combiner, the weight selector processor being configured to correlate the combination of pilot signals with the code associated with the group of pilot signals to produce a weight value associated with each antenna element from the plurality of antenna elements so that a level of correlation between a group of pilot signals and the code uniquely associated with the group of pilot signals is enhanced while a level of correlation between the remaining group of pilot signals and the codes uniquely associated with those remaining groups of pilot signals are suppressed.

16. The apparatus of claim 15, wherein:
the first combiner is configured to iteratively correlate a combination of the plurality of pilot signals with the code associated with the first group of pilot signals to produce the weight value.

17. The apparatus of claim 15, wherein:
the plurality of pilot signals having been embedded with the plurality of codes before being received by the first combiner, the plurality of code having replaced a preexisting OFDM code associated with the plurality of pilot signals.

18. A method for using an orthogonal frequency divisional multiplexing (OFDM) pilot signal in a communication receiver having a plurality of antenna elements, comprising:
  receiving a plurality of data signals and a plurality of pilot signals, the received plurality of data signals having a plurality of data-signal components each being uniquely associated with an antenna element of a plurality of antenna elements, the received plurality of pilot signals having a plurality of pilot-signal components each being uniquely associated with an antenna element of the plurality of antenna elements;
  identifying a group of pilot signals from the plurality of pilot signals based on a code uniquely associated with the group of pilot signals; and
  adjusting a plurality of weight values associated with the plurality of antenna elements so that a level of correlation between the group of pilot signals and its unique code is substantially optimized, the adjusting comprising:
    combining the plurality of pilot signals via a network of phase and amplitude manipulations to produce a combination of pilot signals; and
    correlating the combination of pilot signals with the code associated with the group of pilot signals to produce the weight value associated with each antenna element from the plurality of antenna elements, a level of correlation between the group of pilot signals and the code uniquely associated with the group of pilot signals being enhanced while a level of correlation between the remaining group of pilot signals and the codes uniquely associated with those remaining groups of pilot signals being suppressed,
  whereby a group of data signals from the plurality of data signals and being uniquely associated with the group of pilot signals is substantially optimized by the adjusting of the plurality of weight values associated with the plurality of antenna elements.

19. The method of claim 18, wherein:
the plurality of weight values are adjusted so that a level of correlation between the remaining groups of pilot signals and their unique codes are substantially minimized.

20. The method of claim 18, further comprising:
receiving the codes uniquely associated with the groups of pilot signals before performing the receiving step, the identifying step and the adjusting step.

* * * * *